United States Patent
Barish

(10) Patent No.: US 12,164,996 B2
(45) Date of Patent: *Dec. 10, 2024

(54) SYSTEMS AND METHODS TO OPTIMIZE DECODER PARAMETERS OF AN INDICIA DECODER

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/950,287

(22) Filed: Sep. 22, 2022

(65) Prior Publication Data

US 2024/0104320 A1    Mar. 28, 2024

(51) Int. Cl.
*G06K 7/14*    (2006.01)
*G06K 7/12*    (2006.01)

(52) U.S. Cl.
CPC ............ *G06K 7/12* (2013.01); *G06K 7/1443* (2013.01)

(58) Field of Classification Search
CPC ... G06K 7/1413; G06K 7/1417; G06K 7/1443
USPC ........................................ 235/462.01, 462.25
See application file for complete search history.

(56) References Cited

U.S. PATENT DOCUMENTS

| | | | |
|---|---|---|---|
| 6,478,225 B1* | 11/2002 | Swartz | G06K 7/10861 235/462.25 |
| 6,796,503 B1* | 9/2004 | Fabian | G06K 7/10613 235/462.38 |
| 2014/0239071 A1* | 8/2014 | Hennick | G06K 7/1439 235/455 |
| 2019/0065799 A1* | 2/2019 | Santi | G06K 19/06037 |
| 2021/0110123 A1* | 4/2021 | Brock | G06K 7/10722 |
| 2021/0216950 A1* | 7/2021 | Bizoara | G06V 20/52 |

OTHER PUBLICATIONS

International Search Report and Written Opinion for International Application No. PCT/US2023/28322 mailed on Oct. 19, 2023.

* cited by examiner

*Primary Examiner* — Paultep Savusdiphol
(74) *Attorney, Agent, or Firm* — Yuri Astvatsaturov

(57) ABSTRACT

Methods and systems for optimizing one or more decoder parameters of an indicia decoder are disclosed herein. An example method includes applying a decoder algorithm to a first image data set to detect and decode one or more indicia, wherein the decoder algorithm utilizes a first set of parameters and a second set of parameters. The example method includes determining a minimum value and a maximum value for each parameter of the first set of parameters, and adjusting a parameter of the second set of parameters from a first value to a second value. The example method includes applying the decoder algorithm to a second image data set to detect and decode one or more indicia, and setting the parameter to one of the first value or the second value during subsequent applications of the decoder algorithm.

20 Claims, 5 Drawing Sheets

SYSTEMS AND METHODS TO OPTIMIZE DECODER PARAMETERS OF AN INDICIA DECODER

BACKGROUND

Ever since the introduction of machine vision systems to industrial settings, developers have been attempting to maximize their efficiency as a result of utilizing these systems. For machine vision systems tasked with detecting and decoding indicia, two of the most important metrics impacting efficiency are decode speed and decode reliability. The decode speed and the decode reliability of a machine vision system rely both on the imaging parameters (e.g., exposure length) and the decoder parameters (e.g., indicia characteristics) used to capture, detect, and decode the indicia.

However, a typical indicia decoder includes a wide variety of decoder parameters, such that tuning these parameters to yield an optimal balance of decode speed and decode reliability poses a substantial challenge. Conventionally, users are forced to manually enter each decoder parameter in a guess-and-check fashion until a suitable combination is found. This typically involves such users iteratively applying an indicia decoder to captured image data and manually recording the results of each iteration until the users determine that at least one configuration of decoder parameters yields a suitable result. This presents a significant problem, as it is very inconvenient to the users, and there is no guarantee that the chosen configuration is genuinely suitable, much less the best possible configuration, as it is highly unlikely the users tested every possible combination of decoder parameters. An improperly configured indicia decoder can cause very poor performance of the machine vision system, and as a result, can drastically reduce overall system efficiency.

Thus, there is a need for systems and methods to optimize decoder parameters of an indicia decoder that allow for fast and efficient real-time decoder parameter adjustments for a machine vision system during execution of a machine vision job involving detecting and decoding indicia.

SUMMARY

In an embodiment, the present invention is a method for optimizing one or more decoder parameters of an indicia decoder. The method includes: applying a decoder algorithm to a first image data set of a target object to detect and decode one or more indicia represented in the first image data set, wherein the decoder algorithm utilizes a first set of parameters and a second set of parameters to detect and decode the one or more indicia; determining, based on the detection and decoding of the one or more indicia represented in the first image data set, a minimum value and a maximum value for each parameter of the first set of parameters; adjusting a parameter of the second set of parameters from a first value to a second value, the first value being set for the parameter of the second set of parameters during application of the decoder algorithm to the first image data set; applying the decoder algorithm to a second image data set of the target object to detect and decode one or more indicia represented in the second image data set based on the minimum value and the maximum value for each parameter of the first set of parameters and the second value of the parameter of the second set of parameters; and setting the parameter of the second set of parameters to one of the first value or the second value during subsequent applications of the decoder algorithm based on a comparison of a first number of decoded indicia from the first image data set to a second number of decoded indicia from the second image data set.

In a variation of this embodiment, the first set of parameters includes one or more of: (i) a contrast threshold, (ii) a quiet zone size, (iii) a maximum rectangle ratio, (iv) a minimum module size, (v) a maximum module size, (vi) a minimum row count, (vii) a maximum row count, (viii) a minimum column count, or (ix) a maximum column count, and the second set of parameters includes one or more of: (i) a decode search strength level, (ii) a detection method, or (iii) a barcode priority.

In another variation of this embodiment, setting the parameter of the second set of parameters to the first value or the second value during subsequent applications of the decoder algorithm further includes: comparing the first number of decoded indicia from the first image data set to the second number of decoded indicia from the second image data set; and comparing a first decode time for each decoded indicia from the first image data set to a second decode time for a corresponding decoded indicia from the second image data set, the corresponding decoded indicia being identical to the decoded indicia. Further in this variation, the method may further include: determining that the first decode time for a first decoded indicia from the first image data set is less than the second decode time for the corresponding decoded indicia from the second image data set; and setting the parameter of the second set of parameters to the first value during subsequent applications of the decoder algorithm. Yet further in this variation, the method may include: determining that (i) the first number of decoded indicia is less than the second number of decoded indicia, and (ii) the first decode time for each decoded indicia from the first image data set is less than the second decode time for the corresponding decoded indicia from the second image data set; and setting the parameter of the second set of parameters to the second value during subsequent applications of the decoder algorithm.

In yet another variation of this embodiment, determining the minimum value and the maximum value for each parameter of the first set of parameters further includes: adjusting the minimum value and the maximum value for each parameter of the first set of parameters by a threshold value for subsequent applications of the decoder algorithm; and setting each parameter of the first set of parameters to a value between the minimum value and the maximum value during subsequent applications of the decoder algorithm In still another variation of this embodiment, the second image data set is the first image data set, and the one or more indicia represented in the second image data set are the one or more indicia represented in the first image data set.

In yet another variation of this embodiment, the method further includes: detecting a first number of indicia from the one or more indicia represented in the first image data set; and detecting a second number of indicia from the one or more indicia represented in the second image data set, wherein the first number of indicia and the second number of indicia are different.

In still another variation of this embodiment, the method further includes: adjusting the parameter of the second set of parameters from the second value to a third value; applying the decoder algorithm to a third image data set of the target object to detect and decode one or more indicia represented in the third image data set based on the minimum value and the maximum value for each parameter of the first set of parameters and the third value of the parameter of the second set of parameters; and setting the parameter of the second set of parameters to one of: (i) the first value, (ii) the second value, or (iii) the third value during subsequent applications of the decoder algorithm based on a comparison of a first number of decoded indicia from the first image data set to a second number of decoded indicia from the second image data set and to a third number of decoded indicia from the third image data set.

In yet another variation of this embodiment, the method further includes: (a) designating the second image data set as a current image data set and the parameter of the second set of parameters as a current parameter; (b) automatically setting the current parameter to the first value or the second value; (c) adjusting a subsequent parameter of the second set of parameters from a first value to a second value; (d) capturing, by an imaging device, a subsequent image of the target object, the subsequent image including a subsequent image data set; (e) applying the decoder algorithm to the subsequent image data set to detect and decode one or more indicia represented in the subsequent image data set based on the second value of the subsequent parameter; (f) setting the subsequent parameter to one of the first value or the second value during subsequent applications of the decoder algorithm; (g) designating the subsequent image data set as the current image data set and the subsequent parameter as the current parameter; and (h) iteratively performing steps (c)-(h) until each parameter of the second set of parameters has been set to either the first value or the second value and applied as part of the decoder algorithm to at least one image data set of the target object.

In another embodiment, the present invention is a computer system for optimizing one or more decoder parameters of an indicia decoder. The computer system includes: one or more processors; and a non-transitory computer-readable memory coupled to the imaging device and the one or more processors. The memory stores instructions thereon that, when executed by the one or more processors, cause the one or more processors to: apply a decoder algorithm to a first image data set of a target object to detect and decode one or more indicia represented in the first image data set, wherein the decoder algorithm utilizes a first set of parameters and a second set of parameters to detect and decode the one or more indicia, determine, based on the detection and decoding of the one or more indicia represented in the first image data set, a minimum value and a maximum value for each parameter of the first set of parameters, adjust a parameter of the second set of parameters from a first value to a second value, the first value being set for the parameter of the second set of parameters during application of the decoder algorithm to the first image data set, apply the decoder algorithm to a second image data set of the target object to detect and decode one or more indicia represented in the second image data set based on the minimum value and the maximum value for each parameter of the first set of parameters and the second value of the parameter of the second set of parameters, and set the parameter of the second set of parameters to one of the first value or the second value during subsequent applications of the decoder algorithm based on a comparison of a first number of decoded indicia from the first image data set to a second number of decoded indicia from the second image data set.

In a variation of this embodiment, the first set of parameters includes one or more of: (i) a contrast threshold, (ii) a quiet zone size, (iii) a maximum rectangle ratio, (iv) a minimum module size, (v) a maximum module size, (vi) a minimum row count, (vii) a maximum row count, (viii) a minimum column count, or (ix) a maximum column count; and the second set of parameters includes one or more of: (i) a decode search strength level, (ii) a detection method, or (iii) a barcode priority.

In another variation of this embodiment, the instructions, when executed by the one or more processors, cause the one or more processors to set the parameter of the second set of parameters to the first value or the second value during subsequent applications of the decoder algorithm by: comparing the first number of decoded indicia from the first image data set to the second number of decoded indicia from the second image data set; and comparing a first decode time for each decoded indicia from the first image data set to a second decode time for a corresponding decoded indicia from the second image data set, the corresponding decoded indicia being identical to the decoded indicia. Further in this variation, the instructions, when executed by the one or more processors, cause the one or more processors to: determine that the first decode time for a first decoded indicia from the first image data set is less than the second decode time for the corresponding decoded indicia from the second image data set; and set the parameter of the second set of parameters to the first value during subsequent applications of the decoder algorithm. Yet further in this variation, the instructions, when executed by the one or more processors, cause the one or more processors to: determine that (i) the first number of decoded indicia is less than the second number of decoded indicia, and (ii) the first decode time for each decoded indicia from the first image data set is less than the second decode time for the corresponding decoded indicia from the second image data set; and set the parameter of the second set of parameters to the second value during subsequent applications of the decoder algorithm.

In yet another variation of this embodiment, the instructions, when executed by the one or more processors, cause the one or more processors to determine the minimum value and the maximum value for each parameter of the first set of parameters by: adjusting the minimum value and the maximum value for each parameter of the first set of parameters by a threshold value for subsequent applications of the decoder algorithm; and setting each parameter of the first set of parameters to a value between the minimum value and the maximum value during subsequent applications of the decoder algorithm.

In still another variation of this embodiment, the second image data set is the first image data set, and the one or more indicia represented in the second image data set are the one or more indicia represented in the first image data set.

In yet another variation of this embodiment, the instructions, when executed by the one or more processors, cause the one or more processors to: detect a first number of indicia from the one or more indicia represented in the first image data set; and detect a second number of indicia from the one or more indicia represented in the second image data set, wherein the first number of indicia and the second number of indicia are different.

In still another variation of this embodiment, the instructions, when executed by the one or more processors, cause the one or more processors to: (a) designate the second image data set as a current image data set and the parameter of the second set of parameters as a current parameter; (b) automatically set the current parameter to the first value or the second value; (c) adjust a subsequent parameter of the second set of parameters from a first value to a second value; (d) cause an imaging device to capture a subsequent image of the target object, the subsequent image including a subsequent image data set; (e) apply the decoder algorithm to the subsequent image data set to detect and decode one or more indicia represented in the subsequent image data set based on the second value of the subsequent parameter; (f) set the subsequent parameter to one of the first value or the second value during subsequent applications of the decoder algorithm; (g) designate the subsequent image data set as the current image data set and the subsequent parameter as the current parameter; and (h) iteratively perform steps (c)-(h) until each parameter of the second set of parameters has been set to either the first value or the second value and applied as part of the decoder algorithm to at least one image data set of the target object.

In yet another embodiment, the present invention is a tangible machine-readable medium comprising instructions for optimizing one or more decoder parameters of an indicia decoder that, when executed, cause a machine to at least: apply a decoder algorithm to a first image data set of a target object to detect and decode one or more indicia represented in the first image data set, wherein the decoder algorithm utilizes a first set of parameters and a second set of parameters to detect and decode the one or more indicia; determine, based on the detection and decoding of the one or more indicia represented in the first image data set, a minimum value and a maximum value for each parameter of the first set of parameters; adjust a parameter of the second set of parameters from a first value to a second value, the first value being set for the parameter of the second set of parameters during application of the decoder algorithm to the first image data set; apply the decoder algorithm to a second image data set of the target object to detect and decode one or more indicia represented in the second image data set based on the minimum value and the maximum value for each parameter of the first set of parameters and the second value of the parameter of the second set of parameters; and set the parameter of the second set of parameters to one of the first value or the second value during subsequent applications of the decoder algorithm based on a comparison of a first number of decoded indicia from the first image data set to a second number of decoded indicia from the second image data set.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
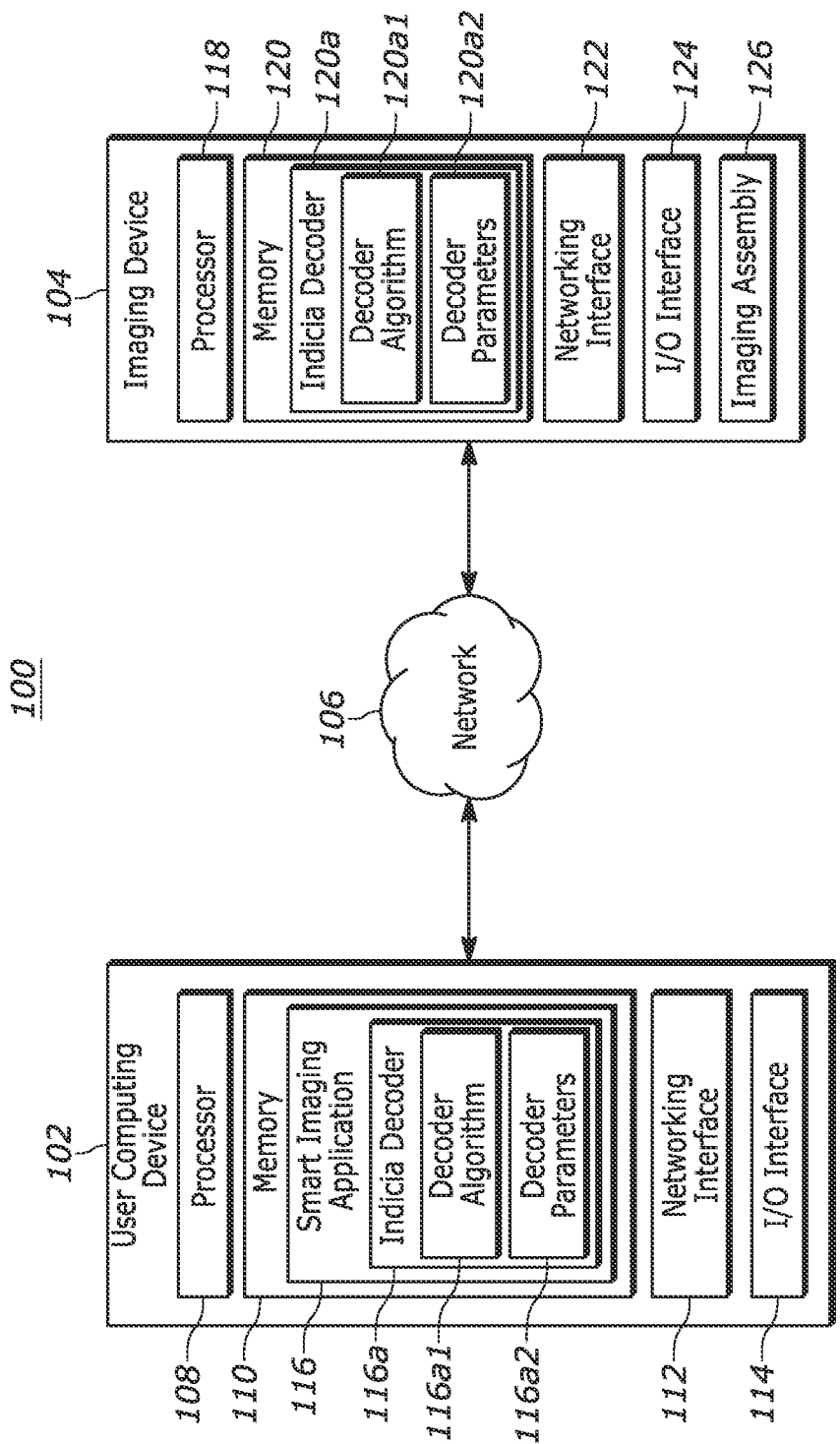
FIG. 1 is an example system for optimizing one or more decoder parameters of an indicia decoder, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Machine vision system owners/operators have conventionally been plagued with being unable to achieve optimal configurations for indicia decoders using conventional manual configuration processes. Manually configuring an indicia decoder is highly time intensive, involves a substantial amount of guesswork from users/operators, and generally results in a non-optimized configuration that reduces decode accuracy, speed, and reliability. Thus, it is an objective of the present disclosure to eliminate these and other problems with conventional machine vision systems by enabling the machine vision system to automatically and intelligently configure decoder parameters for an indicia decoder included as part of the system. In particular, the present disclosure provides a decoder algorithm that may systematically determine optimal settings for each decoder parameter in a manner that ensures correspondingly optimal performance of the indicia decoder. Accordingly, as described herein, the embodiments of the present disclosure may eliminate the need for costly manual decoder parameter configuration and corresponding system downtime, increase the decode accuracy, speed, and reliability of the indicia decoder, and ensure that the system maximizes overall image capture and processing efficiency.

FIG. 1 illustrates an example smart imaging system 100 configured to analyze pixel data of an image of a target object to optimize one or more decoder parameters of an indicia decoder, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The machine vision job may include various machine vision tools (e.g., indicia decoder 120a) configured to perform various machine vision tasks (e.g., indicia detection and decoding). The user computing device 102 may comprise one or more operator workstations, and may include one or more processors 108, one or more memories 110, a networking interface 112, an input/output (I/O) interface 114, and a smart imaging application 116. The smart imaging application 116 may include an indicia decoder 116a, which may further include a decoder algorithm 116a1 and a set of decoder parameters 116a2.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally, or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

Regardless, the smart imaging application 116 may generally be configured to enable machine vision job construction, such that a user may construct machine vision jobs using the smart imaging application 116, as stored on the user computing device 102. In an example implementation, a user may desire that the imaging device 104 automatically detects and decodes indicia that are featured in captured images, and may therefore incorporate the indicia decoder 116*a* into the job script for transmission to the imaging device 104 as part of the job file. When incorporating the indicia decoder 116*a* into the job script, the user may select an option and/or otherwise indicate that the decoder algorithm 116*a*1 should automatically calibrate the set of decoder parameters 116*a*2 when received at the imaging device 104, as described herein, prior to active (e.g., runtime) execution of the indicia decoder 116*a* as part of the machine vision job. The decoder algorithm 120*a*1 may then instruct processors 118 of the imaging device 104 to perform the automatic calibration of the set of decoder parameters 120*a*2, and thereafter the decoder algorithm 120*a*1 may instruct the processors 118 how to detect and decode indicia based on the calibrated set of decoder parameters 120*a*2 during active (e.g., run-time) execution of the indicia decoder 120*a* as part of a machine vision job.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task (e.g., indicia detection/decoding), as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, indicia decoder 116a, 120a, decoder algorithm 116a1, 120a1, set of decoder parameters 116a2, 120a2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. The user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. For example, the I/O interfaces 114, 124 may render the set of decoder parameters 116a2, 120a2 on an operator interface for display to a user/operator after the parameters 116a2, 120a2 are calibrated in accordance with the instructions included as part of the decoder algorithm 116a1, 120a1.

The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information (e.g., calibrated decoder parameters), make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
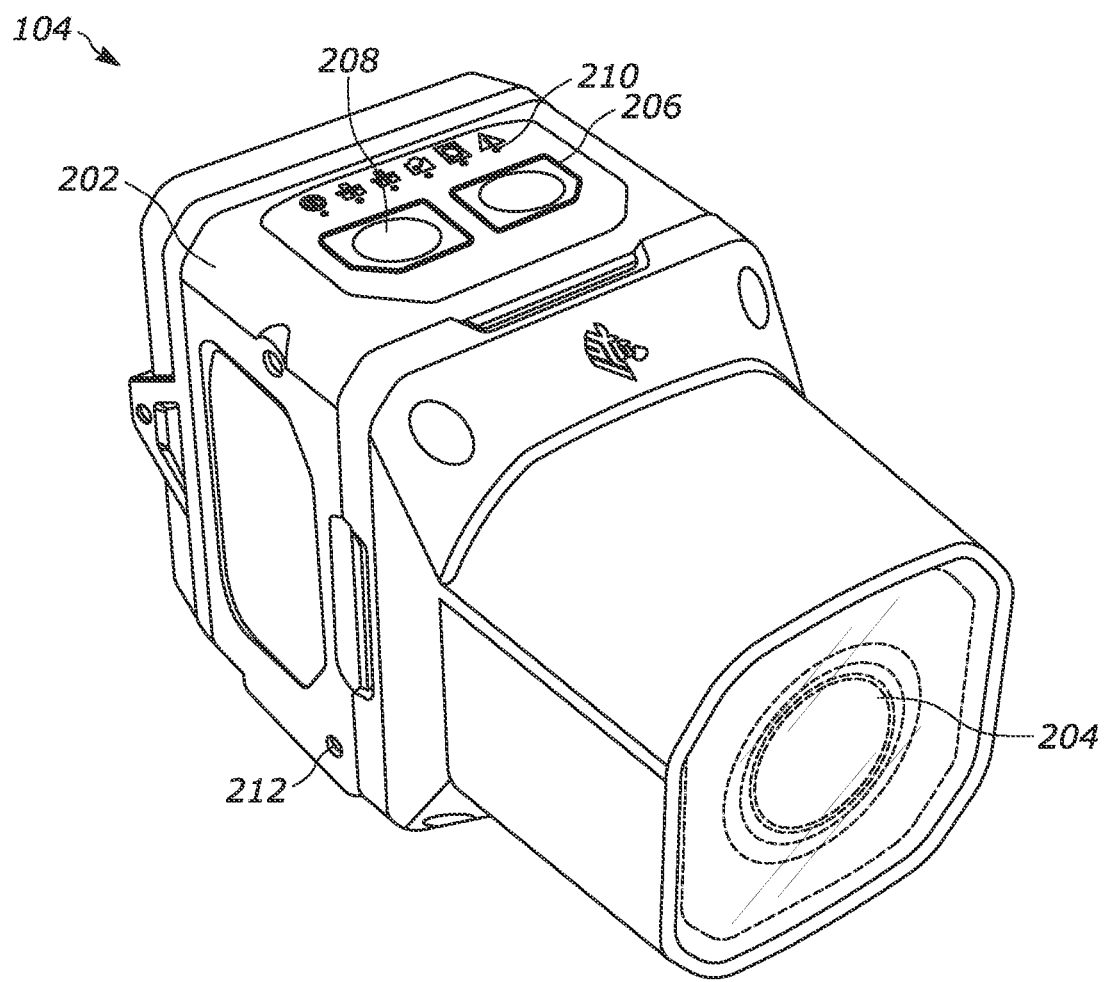
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture. When the imaging settings are calibrated, the imaging device 104 may then proceed to execute the decoder algorithm 120a1 to calibrate the set of decoder parameters 120a2. However, in certain instances, the imaging device 104 may calibrate the set of decoder parameters 120a2 prior to calibrating the imaging settings.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
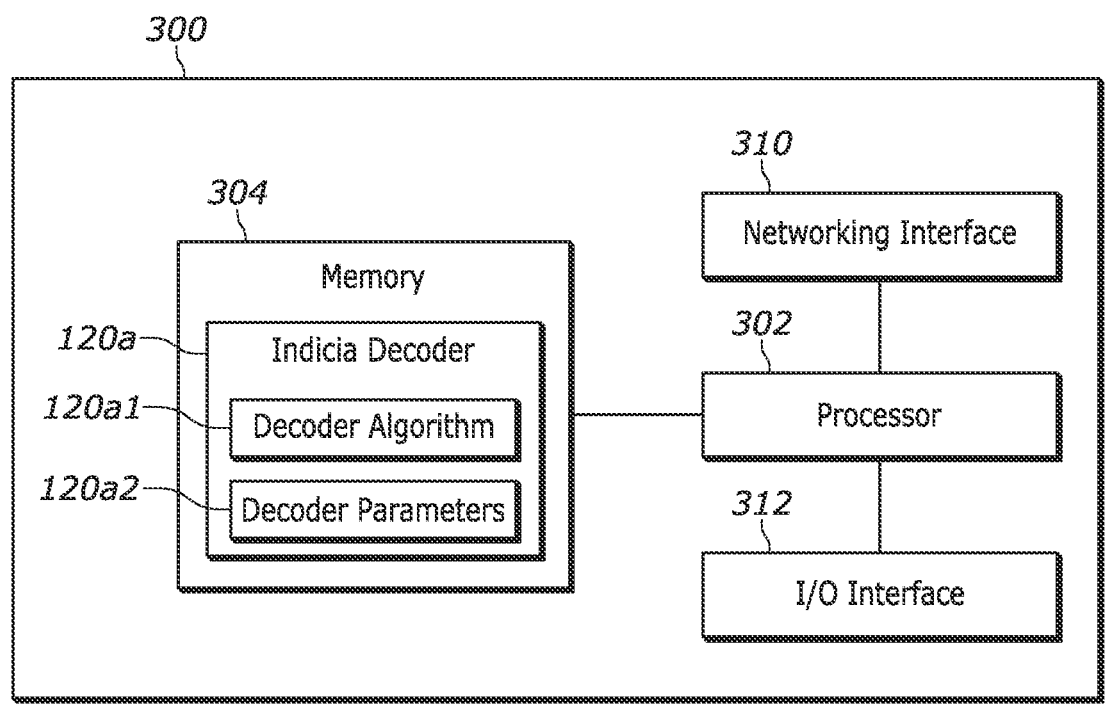
FIG. 3 is a block diagram of an example logic circuit for implementing example methods and/or operations described herein.

FIG. 3 is a block diagram representative of an example logic circuit capable of implementing, for example, one or more components of the example imaging device 104 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure.

The memory 304 also includes the indicia decoder 120a, the decoder algorithm 120a1, and the set of decoder parameters 120a2 that are each accessible by the example processor 302. As previously mentioned, the decoder algorithm 120a1 may comprise rule-based instructions, an artificial intelligence (AI) and/or machine learning-based model, and/or any other suitable algorithm architecture or combination thereof configured to, for example, optimize/calibrate the set of decoder parameters 120a2, detect indicia within captured images, and decode the indicia within the captured images. To illustrate, the example processor 302 may access the memory 304 to execute the decoder algorithm 120a1 when the imaging device 104 (via the imaging assembly 126) captures a set of image data comprising pixel data from a plurality of pixels to detect and decode any indicia represented by the pixel data.

Additionally, or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 310 to enable communication with other machines via, for example, one or more networks. The example network interface 310 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 312 to enable receipt of user input and communication of output data to the user. Such user input and communication may include, for example, any number of keyboards, mice, USB drives, optical drives, screens, touchscreens, etc.

Figure 4:
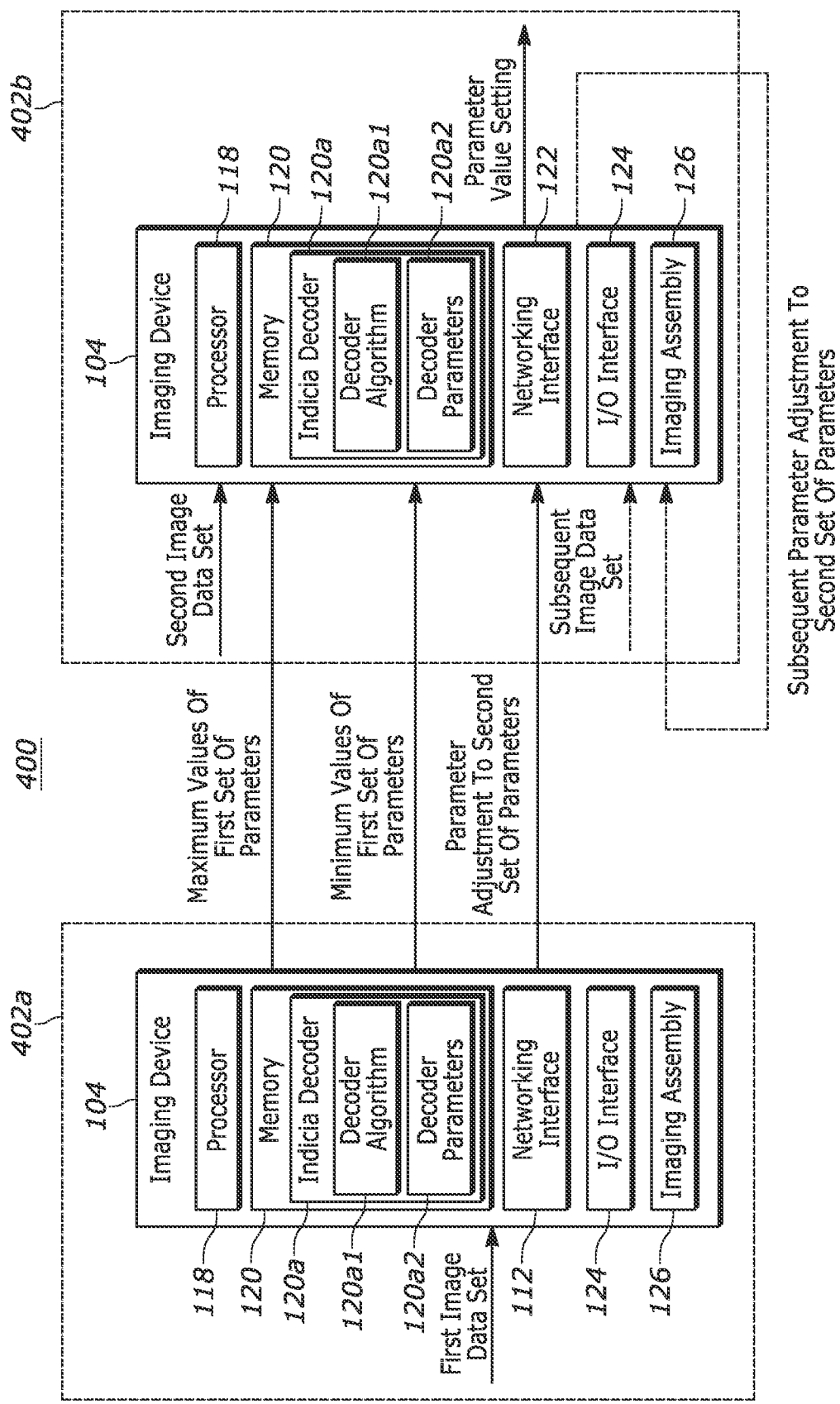
FIG. 4 depicts an example decoder parameter optimization sequence, in accordance with embodiments described herein.

FIG. 4 depicts an example decoder parameter optimization sequence 400, in accordance with embodiments described herein. Generally speaking, the example decoder parameter optimization sequence 400 may represent an imaging device 104 (e.g., via execution of instructions included as part of the decoder algorithm 120a1) determining a parameter value setting for one or more decoder parameters in the set of decoder parameters 120a2. Additionally, as illustrated in FIG. 4, the example parameter optimization sequence 400 may include the imaging device 104 proceeding to determine such parameter value settings for each decoder parameter in the set of decoder parameters 120a2 through subsequent image data sets and subsequent parameter adjustments. As a result of the example decoder parameter optimization sequence 400, the imaging device 104 (via the decoder algorithm 120a1) may optimize/calibrate each decoder parameter in the set of decoder parameters 120a2, and thereby maximize the accuracy, speed, and reliability of the indicia decoder 120a. It should be appreciated that actions performed herein by the processors 118, in reference to FIGS. 4 and 5, may be performed in accordance with instructions contained in memory (e.g., memory 120), and more specifically, in accordance with instructions included as part of the decoder algorithm 120a1.

The example decoder parameter optimization sequence 400 may include two time instances 402a, 402b, during which, the imaging device 104 makes a determination based on various inputs. At the first time instance 402a, the imaging device 104 may receive a first image data set as input and may determine a set of maximum values of a first set of parameters, a set of minimum values of the first set of parameters, and a parameter adjustment to a second set of parameters. Broadly, the first image data set may include image data representing a target object with at least one indicia (e.g., barcode, quick response (QR) code), the first set of parameters may include decoder parameter values that directly correspond to the image data (e.g., a quiet zone size, a minimum row count, etc.), the second set of parameters may include decoder parameter values that correspond to the overall detection/decoding strategy (e.g., a decode search strength level, a barcode priority, etc.), and both the first set of parameters and the second set of parameters may be included in the set of decoder parameters 120a2. The first image data set may include one or more images representing the target object(s).

More specifically, at the first time instance 402a, the imaging device 104 may analyze the first image data set using the indicia decoder 120a to detect all indicia within the first image data set based on the default settings of each decoder parameter in the set of decoder parameters 120a2. The indicia decoder 120a may then attempt to decode each detected indicia, and the indicia decoder 120a may generate decode information for each successful decode. The decode information may generally include data corresponding to each of the first set of parameters. As one example, decode information corresponding to a successful barcode decode may indicate, in part, that the minimum module size for the barcode is four pixels.

To detect the indicia, the processors 118 may execute instructions in the decoder algorithm 120a1 configured to analyze pixel data of the first image data set. Generally, pixel data comprises points or squares of data within an image, where each point or square represents a single pixel within an image. Each pixel may be a specific location within an image. In addition, each pixel may have a specific color (or lack thereof). Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image.

In some implementations, the three RGB components may be represented as three 8-bit numbers for each pixel. Three 8-bit bytes (one byte for each of RGB) is used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 255 and be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values. So (Red=220, Green=220, Blue=220) is a light gray (near white), and (Red=40, Green=40, Blue=40) is a dark gray (near black).

In this manner, the composite of three RGB values creates the final color for a given pixel. With a 24-bit RGB color image using 3 bytes there can be 256 shades of red, and 256 shades of green, and 256 shades of blue. This provides 256×256×256, i.e., 16.7 million possible combinations or colors for 24 bit RGB color images. Thus, the pixel's RGB data value indicates a composition of the pixel in terms of Red, Green, and Blue. The three colors and intensity levels are combined at that image pixel, i.e., at that pixel location on a display screen (e.g., of user computing device 102), to illuminate a display screen at that location with that color. It is to be understood, however, that other bit sizes, having fewer or more bits, e.g., 10-bits, may be used to result in fewer or more overall colors and ranges.

As a whole, the various pixels, positioned together in a grid pattern, form a digital image. A single digital image can comprise thousands or millions of pixels. Images can be captured, generated, stored, and/or transmitted in a number of formats, such as JPEG, TIFF, PNG and GIF. These formats use pixels to store and represent the image.

With continued reference to FIG. 4, the processors 118 may first determine, based on the pixel data (e.g., including their RGB values) included in the first image data set, whether the target object(s) represented in the first image data set includes an indicia (e.g., a barcode, a QR code, etc.) and/or where the indicia is located on the target object(s). The processors 118 may detect indicia within the first image data set by analyzing various RGB values of pixels associated with an indicia within the first image data set, determining that the pixels represent an indicia, and identifying a region surrounding the indicia that bounds all pixels associated with the indicia. For example, dark or low RGB values (e.g., a pixel with values R=25, G=28, B=31) may indicate the typically black colored region of a barcode. A lighter RGB value (e.g., a pixel with R=210, G=234, and B=241) may indicate the typically white region of a barcode (e.g., spaces between the black barcode bars or black square of a QR code).

Together, when a series of pixels in an analyzed region transition from dark or low RGB values to lighter RGB values (or vice versa) in a consistent succession, that may indicate the presence of a barcode or other indicia represented by the series of pixels. For example, an image may feature a front surface of a target object, wherein the front surface includes a barcode near the bottom of the image. The processors 118 may analyze one or more regions of the image until the processors 118 analyze a respective region including pixels representative of the target object's barcode. The processors 118 may recognize that the pixels are indicative of the barcode because the pixels may have a succession of very dark RGB value pixels contrasted with very light RGB value pixels. In this way, the processors 118 may use pixel data (e.g., detailing one or more features of a target object, such as a respective target object's indicia) to detect an indicia.

When an indicia is detected within the first image data set, the decoder algorithm 120a1 may instruct the processors 118 to decode the detected indicia and generate decode information for each successfully decoded indicia. Thereafter, the decoder algorithm 120a1 may instruct the processors 118 to analyze all of the decode information to determine a minimum value and a maximum value for each parameter in the first set of parameters. To illustrate, assume that the first image data set includes three indicia that the processor 118 successfully detects and decodes as a result of executing the decoder algorithm 120a1, such that the processor 118 subsequently analyzes the three sets of decode information associated with the respective indicia. In this example, each set of decode information may include a different maximum module size, such that the first set of decode information has a maximum module size of twenty pixels, the second set of decode information has a maximum module size of fifteen pixels, and the third set of decode information has a maximum module size of seventeen pixels. The processor 118 may analyze these maximum module sizes and determine that the maximum value for the maximum module size is twenty pixels, and that the minimum value for the maximum module size is fifteen pixels.

Further, in some embodiments, the processors 118 may determine the minimum value and the maximum value for each parameter of the first set of parameters by adjusting the minimum value and the maximum value for each parameter of the first set of parameters by a threshold value for subsequent applications of the decoder algorithm 120a1. In reference to the prior example, the processor 118 may adjust the fifteen-pixel minimum value for the maximum module size by a two-pixel threshold value for an adjusted minimum value of thirteen pixels for the maximum module size. Similarly, the processor 118 may adjust the twenty-pixel maximum value for the maximum module size by the two-pixel threshold value for an adjusted maximum value of twenty-two pixels for the maximum module size. Of course, the threshold values may be any suitable value, the processor 118 may apply different threshold values to some/all of the parameters, and different threshold values may apply to minimum/maximum values of a single parameter. For example, the processor 118 may adjust the minimum value for the maximum module size by a two-pixel threshold, and the processor 118 may adjust the maximum value for the maximum module size by a five-pixel threshold to anticipate potentially larger maximum module sizes than were featured in the first image data set instead of significantly smaller maximum module sizes.

When the processors 118 determine the maximum and minimum values for the first set of parameters, the processors 118 may also determine an adjustment to a parameter in the second set of parameters. As previously mentioned, the second set of parameters may generally include decoder parameter values that correspond to the overall detection/decoding strategy (e.g., a decode search strength level, a barcode priority, etc.), such that the adjustment to the parameter from the second set of parameters may adjust the overall detection/decoding strategy implemented by the processors 118 when analyzing image data. For example, the parameter adjustment to the parameter of the second set of parameters may include the processors 118 adjusting the indicia priority from one-dimensional (1D) indicia (e.g., barcode) to two-dimensional (2D) indicia (e.g., QR code). Following this adjustment, the processors 118 analyzing any subsequent image data may prioritize detection and/or decoding of 2D indicia over 1D indicia.

At the second time instance 402*b*, the imaging device 104 may receive the set of maximum values of a first set of parameters, the set of minimum values of the first set of parameters, the parameter adjustment to the second set of parameters, and a second image data set as input; and may determine a parameter value setting for a parameter of the second set of parameters. Generally, the second image data set may include the same target object that was featured in the first image data set. In certain embodiments, the second image data set is the first image data set, and the one or more indicia represented in the second image data set are the one or more indicia represented in the first image data set.

In particular, the processors 118 may analyze the second image data set similarly to the first image data set, but may execute the decoder algorithm 120*a*1 in accordance with the decoder parameters 120*a*2 where the parameter in the second set of parameters is adjusted in accordance with the parameter adjustment. For example, where the processors 118 may have analyzed the first image data set with a fast decode search strength level, the processors 118 may analyze the second image data set with a moderate decode search strength level.

In any event, the processors 118 may detect a second number of indicia from the one or more indicia represented in the second image data set, wherein the first number of indicia detected in the first image data set and the second number of indicia are different. The processors 118 may then decode the second number of indicia and compare the second number of indicia with the number of indicia detected/decoded from the first image data set to determine an appropriate value for the parameter of the second set of parameters. Namely, as a result of the comparison, the processors 118 may determine that the parameter should be set to a first value corresponding to the analysis performed during the first time instance 402*a* or to a second value corresponding to the analysis performed during the second time instance 402*b*. The processors 118 may evaluate the number of decodes at both time instances 402*a*, 402*b*, the time elapsed to perform the decodes at both time instances 402*a*, 402*b*, and/or any other suitable metric.

In certain instances, the processors 118 may compare the first number of decoded indicia from the first image data set to the second number of decoded indicia from the second image data set. The processors 118 may also compare a first decode time for each decoded indicia from the first image data set to a second decode time for a corresponding decoded indicia from the second image data set, and the corresponding decoded indicia may be identical to the decoded indicia. The processors 118 may then determine that the first decode time for a first decoded indicia from the first image data set is less than, greater than, or equal to the second decode time for the corresponding decoded indicia from the second image data set. Accordingly, the processors 118 may set the parameter to the first value during subsequent applications of the decoder algorithm. Alternatively, the processors 118 may determine that (i) the first number of decoded indicia is less than the second number of decoded indicia, and (ii) the first decode time for each decoded indicia from the first image data set is less than the second decode time for the corresponding decoded indicia from the second image data set. In these alternative instances, the processors 118 may set the parameter to the second value during subsequent applications of the decoder algorithm.

For example, the processors 118 may detect and decode four barcodes using the first value of the parameter at the first time instance 402*a*, and the processors 118 may detect and decode five barcodes using the second value of the parameter at the second time instance 402*b*. Further, the processors 118 may have taken an equal amount of time to perform the decodes in both time instances 402*a*, 402*b*. In this example, the processors 118 may determine that the second value of the parameter is the optimal value between the two values, because the second value yielded a larger number of decodes.

In another example, the processors 118 may detect five barcodes and decode four barcodes using the first value of the parameter at the first time instance 402*a*, and the processors 118 may detect six barcodes and decode three barcodes using the second value of the parameter at the second time instance 402*b*. Further, the processors 118 may have taken an equal amount of time to perform the decodes in both time instances 402*a*, 402*b*. In this example, the processors 118 may determine that the first value of the parameter is the optimal value between the two values, because the first value yielded a larger number of decodes, despite the second value yielding a larger number of detections. Of course, in certain instances, the processors 118 may determine that the first value is the optimal value, but in general, the decoder algorithm 120*a*1 may contain instructions configured to prioritize indicia decodes above any other metric (e.g., decode speed, indicia detections, etc.).

In yet another example, the processors 118 may detect and decode four barcodes using the first value of the parameter at the first time instance 402*a*, and the processors 118 may detect and decode four barcodes using the second value of the parameter at the second time instance 402*b*. Further, the processors 118 may have taken less time to perform the decodes in the first time instance 402*a* than in the second time instance 402*b*. In this example, the processors 118 may determine that the first value of the parameter is the optimal value between the two values, because the first value yielded an identical number of decodes as the second value, and the first value caused the processors 118 to decode the four indicia faster than the second value.

In still another example, the processors 118 may detect and decode four barcodes using the first value of the parameter at the first time instance 402*a*, and the processors 118 may detect and decode five barcodes using the second value of the parameter at the second time instance 402*b*.

Further, the processors 118 may have taken less time to perform the decodes in the first time instance 402a than in the second time instance 402b. In this example, the processors 118 may determine that the second value of the parameter is the optimal value between the two values, because the second value yielded a larger number of decodes than the first value. The first value may have resulted in the processors 118 decoding each of the four indicia faster (on a per indicia basis) than the processors 118 decoded each of the five indicia as a result of the second value. However, as previously mentioned, the decoder algorithm 120a1 may contain instructions configured to prioritize indicia decodes above any other metric, such as decode speed per indicia.

Optionally, the imaging device 104 may also determine a subsequent parameter adjustment to a parameter of the second set of parameters during the second time instance 402b. The imaging device 104 may also capture a subsequent image data set, and may determine another parameter value setting based on the subsequent image data set and the subsequent parameter adjustment. Namely, in certain instances, the processors 118 may adjust the parameter from the second value to a third value, and may apply the decoder algorithm 120a1 to a third image data set of the target object to detect and decode one or more indicia represented in the third image data set based on the minimum value and the maximum value for each parameter of the first set of parameters and the third value of the parameter. The processors 118 may also set the parameter to one of: (i) the first value, (ii) the second value, or (iii) the third value during subsequent applications of the decoder algorithm 120a1 based on a comparison of a first number of decoded indicia from the first image data set to a second number of decoded indicia from the second image data set and to a third number of decoded indicia from the third image data set.

In other instances, the processors 118 may designate the second image data set as a current image data set and the parameter as a current parameter, and automatically set the current parameter to the first value or the second value. The processors 118 may also adjust a subsequent parameter of the second set of parameters from a first value to a second value, and cause an imaging device to capture a subsequent image of the target object. The subsequent image may include a subsequent image data set that represents the target object and the indicia associated therewith. The processors 118 may also apply the decoder algorithm 120a1 to the subsequent image data set to detect and decode one or more indicia represented in the subsequent image data set based on the second value of the subsequent parameter. The processors 118 may set the subsequent parameter to one of the first value or the second value during subsequent applications of the decoder algorithm 120a1, and the processors 118 may also designate the subsequent image data set as the current image data set and the subsequent parameter as the current parameter. The processors 118 may also iteratively perform these steps until each parameter of the second set of parameters has been set to either the first value or the second value and applied as part of the decoder algorithm to at least one image data set of the target object. In other words, the processors 118 may iteratively perform the steps described above until each parameter of the second set of parameters has been evaluated for potential adjustment from the first value to the second value.

As an example, the processors 118 may analyze the second image data set and determine that the decode search strength level has an optimal setting of moderate (e.g., a second value) instead of fast (e.g., a first value). In this example, the processors 118 may cause the imaging assembly 126 to capture a subsequent image data set, and the processors 118 may apply a subsequent parameter adjustment to the decode search strength level parameter to analyze the performance of an exhaustive (e.g., a third value) decode search strength level on the subsequent image data set. The processors 118 may determine that the exhaustive decode search strength level performed worse (e.g., fewer indicia decodes, slower indicia decodes, etc.) than the moderate decode search strength level, and as a result, the processors 118 may keep the decode search strength level parameter at the second value (moderate). Alternatively, the processors 118 may determine that the exhaustive decode search strength level performed better (e.g., more indicia decodes, faster indicia decodes, etc.) than the moderate decode search strength level, and as a result, the processors 118 may change the decode search strength level parameter to the third value (exhaustive).

Of course, the processors 118 may repeat this subsequent image data set capture and subsequent parameter adjustment as many times as is necessary to determine which parameter (s) enable the indicia decoder 120a to detect and decode as many indicia as possible for a particular image data set. For example, if a first parameter of the second set of parameters has three potential values (e.g., fast, moderate, exhaustive) and a second parameter of the second set of parameters has six potential values, then the processors 118 may perform this iterative image data set capture and parameter adjustment at least three times for the first parameter (e.g., once for each potential value) and six times for the second parameter.

Figure 5:
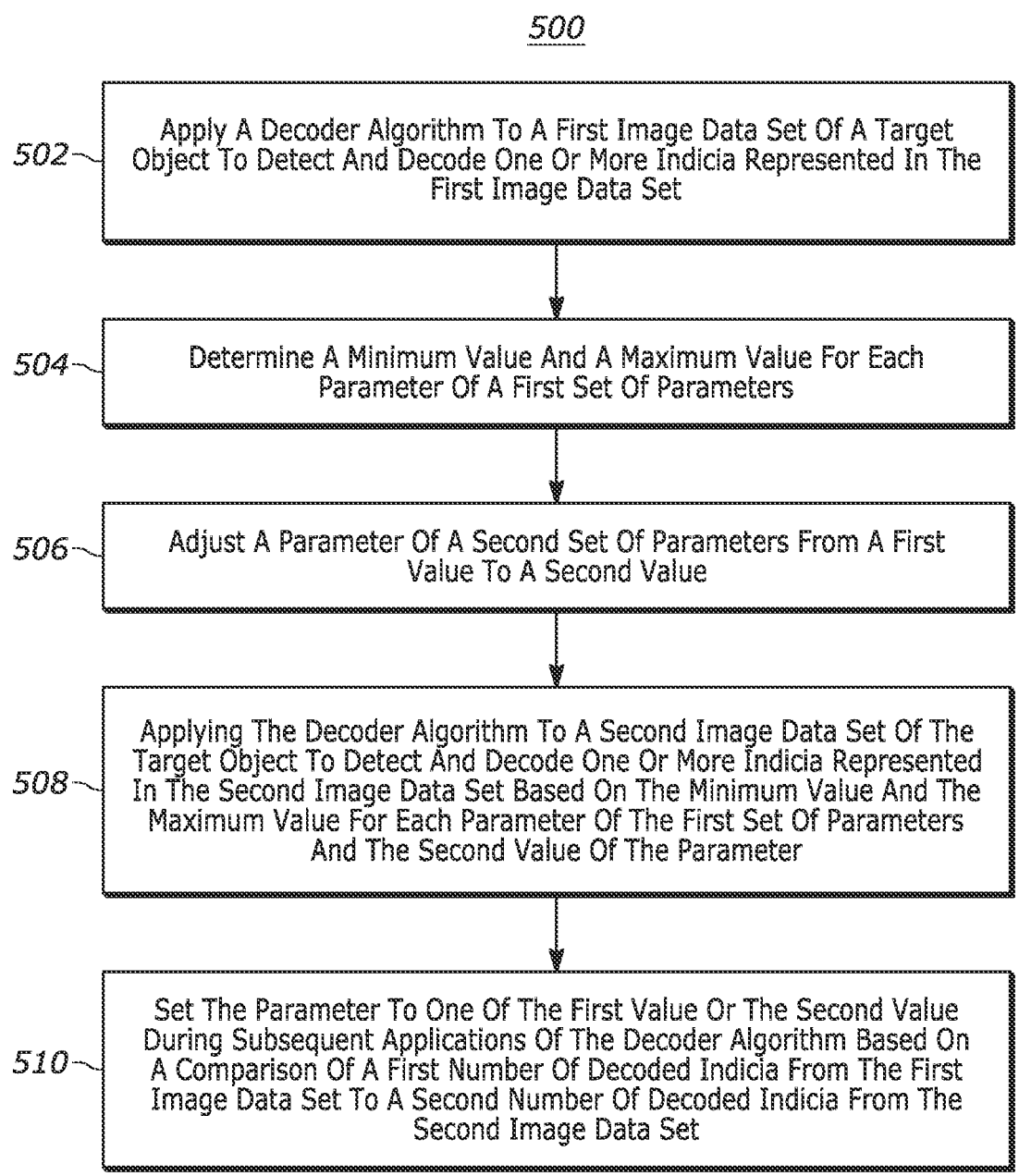
FIG. 5 is a flowchart representative of a method for optimizing one or more decoder parameters of an indicia decoder, in accordance with embodiments described herein.

FIG. 5 is a flowchart representative of a method 500 for optimizing one or more decoder parameters (e.g., decoder parameters 120a2) of an indicia decoder (e.g., indicia decoder 120a), in accordance with embodiments described herein. The method 500 describes various methods for optimizing one or more decoder parameters of an indicia decoder. However, generally speaking, the method 500 for optimizing one or more decoder parameters of an indicia decoder includes applying a decoder algorithm (e.g., decoder algorithm 120a1) to a first image data set, determining minimum and maximum values for each parameter of the first set of parameters, adjusting a parameter of the second set of parameters, applying the decoder algorithm to a second image data set, and setting the parameter to a first or a second value. It is to be understood that the imaging device 104, the user computing device 102, components thereof (e.g., decoder algorithm 102a1), and/or other components described herein and combinations thereof may be configured to perform the various actions and functionalities of the method 500 described herein.

The method 500 may include applying a decoder algorithm to a first image data set of a target object to detect and decode one or more indicia represented in the first image data set (block 502). The decoder algorithm 120a1 may utilize a first set of parameters and a second set of parameters to detect and decode the one or more indicia. In certain embodiments, the first set of parameters includes one or more of: (i) a contrast threshold, (ii) a quiet zone size, (iii) a maximum rectangle ratio, (iv) a minimum module size, (v) a maximum module size, (vi) a minimum row count, (vii) a maximum row count, (viii) a minimum column count, or (ix) a maximum column count.

For example, the contrast threshold may generally correspond to a black/white (or other suitable color/value scheme) contrast mapping that defines the presence of a barcode or other indicia within an image data set. The quiet zone size may generally correspond to an area surrounding a barcode or other indicia (e.g., a white space surrounding a barcode), and may be represented as the smallest number of pixels within an image data set between an indicia and a non-white area within the image data set. The maximum rectangle ratio may represent a height and width-based measurement of an area within an image data set that corresponds to a known height/width ratio of an indicia. The minimum/maximum module size may correspond to the smallest/largest dot or other region of an indicia within an image data set, such as the pixels per meter (PPM) of a narrowest/widest bar of a barcode within an image data set. The minimum/maximum row/column count may correspond to the minimum/maximum number of rows/columns that are allowed to be part of an indicia within an image data set. Of course, the first set of parameters may include more or fewer parameters, such as an option to enable/disable rectangular indicia detection based on whether or not the indicia within the image data set are known to be rectangular (e.g., barcodes) or square (e.g., QR codes).

In some embodiments, the second set of parameters may include one or more of: (i) a decode search strength level, (ii) a detection method, or (iii) a barcode priority. For example, the decode search strength level may generally indicate a decoding methodology implemented by the processors 118, and the decoding strategy may be set to fast, moderate, or exhaustive. Each setting may correspond to how long the processors 118 look for indicia within an image data set, how many indicia the processors 118 may detect in an image data set, and/or any other suitable metrics. The detection method may generally correspond to one or more methodologies implemented by the processors 118 to detect indicia within an image data set, such as a uniform detection method, a quiet zone detection method, and/or a finder pattern detection method. The barcode priority, as previously mentioned, may generally correspond to a prioritization of one or more particular indicia types when detecting/decoding indicia within an image data set. For example, the barcode priority may include a one-dimensional (1D) indicia (e.g., barcode) value and a two-dimensional (2D) indicia (e.g., QR code) value. If the processors 118 determine that the 2D indicia should be prioritized, then the barcode priority may be the 2D indicia value, such that the processors 118 may analyze any subsequent image data by prioritizing detection and/or decoding of 2D indicia over 1D indicia.

The method 500 may include determining, based on the detection and decoding of the one or more indicia represented in the first image data set, a minimum value and a maximum value for each parameter of the first set of parameters (block 504). In certain embodiments, the method 500 may further include adjusting the minimum value and the maximum value for each parameter of the first set of parameters by a threshold value for subsequent applications of the decoder algorithm, and setting each parameter of the first set of parameters to a value between the minimum value and the maximum value during subsequent applications of the decoder algorithm. The method 500 may also include adjusting a parameter of the second set of parameters from a first value to a second value (block 506). The first value may be set for the parameter during, for example, application of the decoder algorithm to the first image data set.

The method 500 may include applying the decoder algorithm to a second image data set of the target object to detect and decode one or more indicia represented in the second image data set based on the minimum value and the maximum value for each parameter of the first set of parameters and the second value of the parameter (block 508). In some embodiments, the second image data set is the first image data set, and the one or more indicia represented in the second image data set are the one or more indicia represented in the first image data set.

In certain embodiments, the method 500 may further include detecting a first number of indicia from the one or more indicia represented in the first image data set, and detecting a second number of indicia from the one or more indicia represented in the second image data set. In these embodiments, the first number of indicia and the second number of indicia may be different.

The method 500 may include setting the parameter to one of the first value or the second value during subsequent applications of the decoder algorithm based on a comparison of a first number of decoded indicia from the first image data set to a second number of decoded indicia from the second image data set (block 510). In some embodiments, the processors 118 may compare the first number of decoded indicia from the first image data set to the second number of decoded indicia from the second image data set. In these embodiments, the processors 118 may compare a first decode time for each decoded indicia from the first image data set to a second decode time for a corresponding decoded indicia from the second image data set. The corresponding decoded indicia may be identical to the decoded indicia.

Further in the prior embodiments, the processors 118 may determine that the first decode time for a first decoded indicia from the first image data set is less than the second decode time for the corresponding decoded indicia from the second image data set. In this instance, the processors 118 may set the parameter to the first value during subsequent applications of the decoder algorithm. Alternatively, the processors 118 may determine that (i) the first number of decoded indicia is less than the second number of decoded indicia, and (ii) the first decode time for each decoded indicia from the first image data set is less than the second decode time for the corresponding decoded indicia from the second image data set. In these instances, the processors 118 may set the parameter to the second value during subsequent applications of the decoder algorithm.

In certain embodiments, the method 500 may further include adjusting the parameter from the second value to a third value. In these embodiments, the method 500 may include applying the decoder algorithm to a third image data set of the target object to detect and decode one or more indicia represented in the third image data set based on the minimum value and the maximum value for each parameter of the first set of parameters and the third value of the parameter. Moreover, the method 500 may additionally include setting the parameter to one of: (i) the first value, (ii) the second value, or (iii) the third value during subsequent applications of the decoder algorithm based on a comparison of a first number of decoded indicia from the first image data set to a second number of decoded indicia from the second image data set and to a third number of decoded indicia from the third image data set.

In some embodiments, the method 500 may further include designating the second image data set as a current image data set and the parameter as a current parameter. In these embodiments, the method 500 may additionally include automatically setting the current parameter to the first value or the second value, and adjusting a subsequent parameter of the second set of parameters from a first value to a second value. Further, the method 500 may include capturing, by an imaging device (e.g., imaging assembly 126), a subsequent image of the target object, and the subsequent image may include a subsequent image data set.

The method 500 may further include applying the decoder algorithm to the subsequent image data set to detect and decode one or more indicia represented in the subsequent image data set based on the second value of the subsequent parameter, and setting the subsequent parameter to one of the first value or the second value during subsequent applications of the decoder algorithm. The method 500 may further include designating the subsequent image data set as the current image data set and the subsequent parameter as the current parameter, and iteratively performing each of the above-described actions until each parameter of the second set of parameters has been set to either the first value or the second value and applied as part of the decoder algorithm to at least one image data set of the target object.

Additionally, it is to be understood that each of the actions described in the method 500 may be performed in any order, number of times, or any other combination(s) therein suitable to optimize one or more decoder parameters for an indicia decoder. For example, some or all of the blocks of the method 500 may be fully performed once, multiple times, or not at all.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for optimizing one or more decoder parameters of an indicia decoder, the method comprising:
    applying a decoder algorithm to a first image data set of a target object to detect and decode one or more indicia represented in the first image data set, wherein the decoder algorithm utilizes a first set of parameters and a second set of parameters to detect and decode the one or more indicia;
    determining, based on the detection and decoding of the one or more indicia represented in the first image data set, a minimum value and a maximum value for each parameter of the first set of parameters;
    adjusting a parameter of the second set of parameters from a first value to a second value, the first value being set for the parameter during application of the decoder algorithm to the first image data set;
    applying the decoder algorithm to a second image data set of the target object to detect and decode one or more indicia represented in the second image data set based on the minimum value and the maximum value for each parameter of the first set of parameters and the second value of the parameter of the second set of parameters; and
    setting the parameter of the second set of parameters to one of the first value or the second value during subsequent applications of the decoder algorithm based on a comparison of a first number of decoded indicia from the first image data set to a second number of decoded indicia from the second image data set.

2. The method of claim 1, wherein
    the first set of parameters includes one or more of: (i) a contrast threshold, (ii) a quiet zone size, (iii) a maximum rectangle ratio, (iv) a minimum module size, (v) a maximum module size, (vi) a minimum row count, (vii) a maximum row count, (viii) a minimum column count, or (ix) a maximum column count, and
    the second set of parameters includes one or more of: (i) a decode search strength level, (ii) a detection method, or (iii) a barcode priority.

3. The method of claim 1, wherein setting the parameter of the second set of parameters to the first value or the second value during subsequent applications of the decoder algorithm further comprises:
    comparing the first number of decoded indicia from the first image data set to the second number of decoded indicia from the second image data set; and
    comparing a first decode time for each decoded indicia from the first image data set to a second decode time for a corresponding decoded indicia from the second image data set, the corresponding decoded indicia being identical to the decoded indicia.

4. The method of claim 3, further comprising:
    determining that the first decode time for a first decoded indicia from the first image data set is less than the second decode time for the corresponding decoded indicia from the second image data set; and
    setting the parameter of the second set of parameters to the first value during subsequent applications of the decoder algorithm.

5. The method of claim 3, further comprising:
    determining that (i) the first number of decoded indicia is less than the second number of decoded indicia, and (ii) the first decode time for each decoded indicia from the first image data set is less than the second decode time for the corresponding decoded indicia from the second image data set; and
    setting the parameter of the second set of parameters to the second value during subsequent applications of the decoder algorithm.

6. The method of claim 1, wherein determining the minimum value and the maximum value for each parameter of the first set of parameters further comprises:
    adjusting the minimum value and the maximum value for each parameter of the first set of parameters by a threshold value for subsequent applications of the decoder algorithm; and
    setting each parameter of the first set of parameters to a value between the minimum value and the maximum value during subsequent applications of the decoder algorithm.

7. The method of claim 1, wherein the second image data set is the first image data set, and the one or more indicia represented in the second image data set are the one or more indicia represented in the first image data set.

8. The method of claim 1, further comprising:
    detecting a first number of indicia from the one or more indicia represented in the first image data set; and
    detecting a second number of indicia from the one or more indicia represented in the second image data set, wherein the first number of indicia and the second number of indicia are different.

9. The method of claim 1, further comprising:
    adjusting the parameter of the second set of parameters from the second value to a third value;

applying the decoder algorithm to a third image data set of the target object to detect and decode one or more indicia represented in the third image data set based on the minimum value and the maximum value for each parameter of the first set of parameters and the third value of the parameter of the second set of parameters; and setting the parameter of the second set of parameters to one of: (i) the first value, (ii) the second value, or (iii) the third value during the subsequent applications of the decoder algorithm based on a comparison of a first number of decoded indicia from the first image data set to a second number of decoded indicia from the second image data set and to a third number of decoded indicia from the third image data set.

10. The method of claim 1, further comprising:
(a) designating the second image data set as a current image data set and the parameter of the second set of parameters as a current parameter;
(b) automatically setting the current parameter to the first value or the second value;
(c) adjusting a subsequent parameter of the second set of parameters from a first value to a second value;
(d) capturing, by an imaging device, a subsequent image of the target object, the subsequent image including a subsequent image data set;
(e) applying the decoder algorithm to the subsequent image data set to detect and decode one or more indicia represented in the subsequent image data set based on the second value of the subsequent parameter;
(f) setting the subsequent parameter to one of the first value or the second value during subsequent applications of the decoder algorithm;
(g) designating the subsequent image data set as the current image data set and the subsequent parameter as the current parameter; and
(h) iteratively performing steps (c)-(h) until each parameter of the second set of parameters has been set to either the first value or the second value and applied as part of the decoder algorithm to at least one image data set of the target object.

11. A computer system for optimizing one or more decoder parameters of an indicia decoder, the system comprising:
one or more processors; and
a non-transitory computer-readable memory coupled to the imaging device and the one or more processors, the memory storing instructions thereon that, when executed by the one or more processors, cause the one or more processors to:
apply a decoder algorithm to a first image data set of a target object to detect and decode one or more indicia represented in the first image data set, wherein the decoder algorithm utilizes a first set of parameters and a second set of parameters to detect and decode the one or more indicia,
determine, based on the detection and decoding of the one or more indicia represented in the first image data set, a minimum value and a maximum value for each parameter of the first set of parameters,
adjust a parameter of the second set of parameters from a first value to a second value, the first value being set for the parameter of the second set of parameters during application of the decoder algorithm to the first image data set,
apply the decoder algorithm to a second image data set of the target object to detect and decode one or more indicia represented in the second image data set based on the minimum value and the maximum value for each parameter of the first set of parameters and the second value of the parameter of the second set of parameters, and
set the parameter of the second set of parameters to one of the first value or the second value during subsequent applications of the decoder algorithm based on a comparison of a first number of decoded indicia from the first image data set to a second number of decoded indicia from the second image data set.

12. The computer system of claim 11, wherein
the first set of parameters includes one or more of: (i) a contrast threshold, (ii) a quiet zone size, (iii) a maximum rectangle ratio, (iv) a minimum module size, (v) a maximum module size, (vi) a minimum row count, (vii) a maximum row count, (viii) a minimum column count, or (ix) a maximum column count; and
the second set of parameters includes one or more of: (i) a decode search strength level, (ii) a detection method, or (iii) a barcode priority.

13. The computer system of claim 11, wherein the instructions, when executed by the one or more processors, cause the one or more processors to set the parameter of the second set of parameters to the first value or the second value during subsequent applications of the decoder algorithm by:
comparing the first number of decoded indicia from the first image data set to the second number of decoded indicia from the second image data set; and
comparing a first decode time for each decoded indicia from the first image data set to a second decode time for a corresponding decoded indicia from the second image data set, the corresponding decoded indicia being identical to the decoded indicia.

14. The computer system of claim 13, wherein the instructions, when executed by the one or more processors, cause the one or more processors to:
determine that the first decode time for a first decoded indicia from the first image data set is less than the second decode time for the corresponding decoded indicia from the second image data set; and
set the parameter of the second set of parameters to the first value during subsequent applications of the decoder algorithm.

15. The computer system of claim 13, wherein the instructions, when executed by the one or more processors, cause the one or more processors to:
determine that (i) the first number of decoded indicia is less than the second number of decoded indicia, and (ii) the first decode time for each decoded indicia from the first image data set is less than the second decode time for the corresponding decoded indicia from the second image data set; and
set the parameter of the second set of parameters to the second value during subsequent applications of the decoder algorithm.

16. The computer system of claim 11, wherein the instructions, when executed by the one or more processors, cause the one or more processors to determine the minimum value and the maximum value for each parameter of the first set of parameters by:
adjusting the minimum value and the maximum value for each parameter of the first set of parameters by a threshold value for subsequent applications of the decoder algorithm; and setting each parameter of the first set of parameters to a value between the minimum value and the maximum value during subsequent applications of the decoder algorithm.

17. The computer system of claim 11, wherein the second image data set is the first image data set, and the one or more indicia represented in the second image data set are the one or more indicia represented in the first image data set.

18. The computer system of claim 11, wherein the instructions, when executed by the one or more processors, cause the one or more processors to:
   detect a first number of indicia from the one or more indicia represented in the first image data set; and
   detect a second number of indicia from the one or more indicia represented in the second image data set, wherein the first number of indicia and the second number of indicia are different.

19. The computer system of claim 11, wherein the instructions, when executed by the one or more processors, cause the one or more processors to:
   (a) designate the second image data set as a current image data set and the parameter of the second set of parameters as a current parameter;
   (b) automatically set the current parameter to the first value or the second value;
   (c) adjust a subsequent parameter of the second set of parameters from a first value to a second value;
   (d) cause an imaging device to capture a subsequent image of the target object, the subsequent image including a subsequent image data set;
   (e) apply the decoder algorithm to the subsequent image data set to detect and decode one or more indicia represented in the subsequent image data set based on the second value of the subsequent parameter;
   (f) set the subsequent parameter to one of the first value or the second value during subsequent applications of the decoder algorithm;
   (g) designate the subsequent image data set as the current image data set and the subsequent parameter as the current parameter; and
   (h) iteratively perform steps (c)-(h) until each parameter of the second set of parameters has been set to either the first value or the second value and applied as part of the decoder algorithm to at least one image data set of the target object.

20. A tangible machine-readable medium comprising instructions for optimizing one or more decoder parameters of an indicia decoder that, when executed, cause a machine to at least:
   apply a decoder algorithm to a first image data set of a target object to detect and decode one or more indicia represented in the first image data set, wherein the decoder algorithm utilizes a first set of parameters and a second set of parameters to detect and decode the one or more indicia;
   determine, based on the detection and decoding of the one or more indicia represented in the first image data set, a minimum value and a maximum value for each parameter of the first set of parameters;
   adjust a parameter of the second set of parameters from a first value to a second value, the first value being set for the parameter of the second set of parameters during application of the decoder algorithm to the first image data set;
   apply the decoder algorithm to a second image data set of the target object to detect and decode one or more indicia represented in the second image data set based on the minimum value and the maximum value for each parameter of the first set of parameters and the second value of the parameter of the second set of parameters; and
   set the parameter of the second set of parameters to one of the first value or the second value during subsequent applications of the decoder algorithm based on a comparison of a first number of decoded indicia from the first image data set to a second number of decoded indicia from the second image data set.

\* \* \* \* \*